United States Patent [19]
Kato et al.

[11] 3,851,180
[45] Nov. 26, 1974

[54] APPARATUS FOR MEASURING THE DIAMETER OF FINE WIRES

[75] Inventors: Kazuhiro Kato; Noboru Murata, both of Tokyo; Goro Kobayashi, Oisomachi, all of Japan

[73] Assignee: Oki Electric Industry Co., Ltd., Tokyo, Japan

[22] Filed: June 18, 1973

[21] Appl. No.: 371,187

[52] U.S. Cl............ 250/550, 250/237 G, 250/560, 356/160
[51] Int. Cl. ............................................ G01b 7/12
[58] Field of Search ............ 250/219 S, 237 G, 550, 250/559, 560, 561, 571; 356/159, 160, 106, 199; 350/314

[56] References Cited
UNITED STATES PATENTS

| | | | |
|---|---|---|---|
| 3,450,889 | 6/1969 | Baker............................. | 356/159 X |
| 3,578,980 | 5/1971 | Decker, Jr. et al............. | 250/237 G |
| 3,709,610 | 1/1973 | Kruegle......................... | 356/111 X |
| 3,738,753 | 6/1973 | Huntley, Jr. ................... | 250/237 G |

FOREIGN PATENTS OR APPLICATIONS

| | | | |
|---|---|---|---|
| 1,229,739 | 12/1966 | Germany........................... | 356/159 |

Primary Examiner—Walter Stolwein
Attorney, Agent, or Firm—Dike, Bronstein, Roberts, Cushman & Pfund

[57] ABSTRACT

In apparatus for measuring the diameter of a fine wire of the type wherein parallel laser beams are projected upon the fine wire in the diametric direction thereof so as to form a Fraunhofer diffraction image and the spacing between the peak bright spots of the diffraction image is counted, there are provided an optical filter for making the level of the signal at the optical center of the Fraunhofer diffraction image to be equal to the level of the signal subjected to a predetermined number of diffractions, and a photoelectric transducer responsive to these two signals. The output wave of the photoelectric transducer is shaped, chopped and then applied to a counter which operates to determine the distance between the centers of said two signals.

3 Claims, 1 Drawing Figure

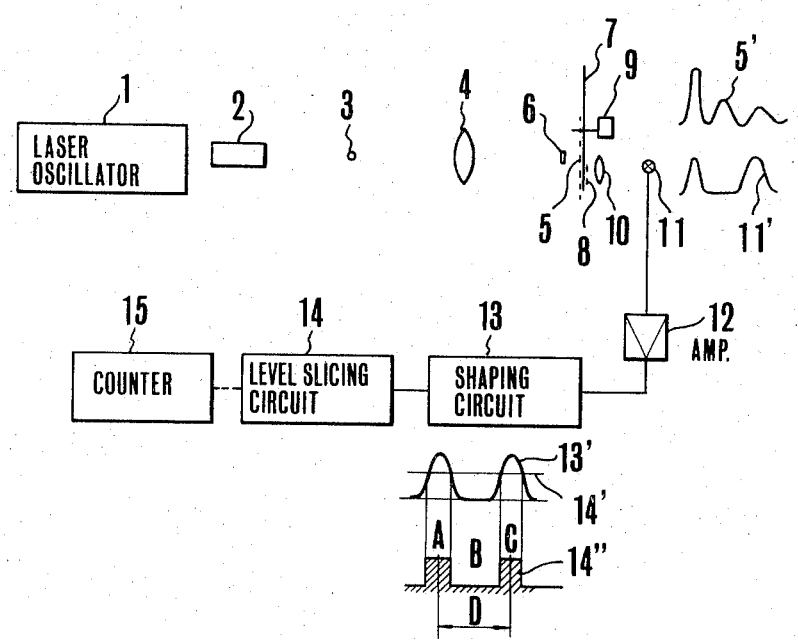

APPARATUS FOR MEASURING THE DIAMETER OF FINE WIRES

BACKGROUND OF THE INVENTION

This invention relates to apparatus for measuring the diameter of a fine wire by counting the spacing between bright spots of a Fraunhofer diffraction image formed by irradiating the fine with parallel laser light beams.

In the prior art apparatus, to count the spacing between peak values of bright spots of the Fraunhofer diffraction wave, it has been usual to differentiate the detected waveform to determine the peak values of the diffraction wave and then count the spacing between the peak values. However, it has been difficult to accurately defect the peak values because the diffraction wave is not a perfect sinusoidal wave so that the peaks have certain width.

SUMMARY OF THE INVENTION

It is an object of this invention to provide improved apparatus for measuring the diameter of fine wires without accompanying such difficulty.

Another object of this invention is to provide a novel apparatus for accurately measuring the diameter of a fine wire by means of laser light without touching the wire.

According to this invention there is provided apparatus for measuring the diameter of a fine wire, comprising means for irradiating the fine wire with parallel laser beams in diametric direction thereof thereby forming a Fraunhofer diffraction image, an optical filter for making the level of the signal at the optical center of said Fraunhofer diffraction image to be equal to the level of the signal subjected to a predetermined number of diffractions, a photoelectric transducer responsive to said two signals, a shaping circuit connected to the output of the photoelectric transducer, a level slicing circuit connected to the output the shaping circuit and a counter connected to the output of the level slicing circuit, said counter operating to count and display the distance between the centers of the center signal and of the signal subjected to a predetermined number of diffractions.

BRIEF DESCRIPTION OF THE DRAWING

The invention can be more fully understood from the following detailed description taken in conjunction with the accompanying DRAWING in which a single FIGURE is a block diagram showing the principle of one embodiment of this invention.

DESCRIPTION OF THE PREFERRED EMBODIMENT

A preferred embodiment of this invention illustrated in the accompanying drawing comprises a laser oscillator 1 of any conventional construction, a telescope 2 for converting the laser beam generated by the laser oscillator 1 into parallel beams which are projected upon a fine wire 3 in the diametrical direction thereof, and a lens 4. When the fine wire 3 is positioned at the focus of the lens 4, the Fraunhofer diffraction image 5 will be focused at a point displaced from the lens by a distance equal to the focal length of the lens. When the wavelength of the laser beam is denoted by λ, the focal length of the lens 4 by $L$, and the spacer between the bright spots of the Fraunhofer diffraction image 5 by $d$, then the diameter $\Phi$ of the fine wire 3 will be given by an equation $$\Phi = \lambda L/d$$

Behind lens 4 is positioned an optical filter 6 adapted to make the level of the laser light beam at the center to be substantially equal to that of the light subjected to a particular number of diffractions. Further, there are provided a rotary mask in the form of a slitted rotary disc 7 for detecting the position of the bright spots of the Fraunhofer diffraction image 5, and a light intercepting mask in the form of a stationary slit 8 for detecting the bright spots of the Fraunhofer diffraction image 5 after it has been subjected to a predetermined number of diffractions. The rotary disc 7 is driven by an electric motor 9 and the light transmitting through the rotary disc 7 and the light intercepting mask 8 is received by a photoelectric transducer 11.

The output of the photoelectric transducer 11 is amplified by an amplifier 12 and the output thereof is applied to a level slicing and rectangular wave generating circuit 14 through a shaping circuit 13. The output of the slicing of chopper circuit 14 is applied to a counter 15.

The apparatus described above operates in the following manner.

When the fine wire 3 whose diameter is to be measured is irradiated with the parallel laser beams produced by telescope 2 a Fraunhofer diffraction image 5 is formed having a waveform as shown by 5′. This light signal is received by the photoelectric transducer 11 through rotary disc mask 7, light intercepting mask 8 and lens 10, thereby producing an output signal as shown by a curve 11′. This output signal is shaped by shaping circuit 13 to have a waveform as shown by a curve 13′ which is formed into waveform 14″ by slicing the peaks above a predetermined level 14′ in the level slicing circuit 14. Denoting the center signal of the laser beam by $A$, the signal subjected to a predetermined number of diffractions by $C$ and the spacing between signals $A$ and $C$ by $B$, the counter 15 counts a value of $(A/2 + B + C/2)$.

In this manner, the counter 15 counts each one half of the width of the center signal and of the signal subjected to a predetermined number of diffractions of the Fraunhofer image and adds these one halves to the spacing between these two signals, thus accurately displaying the distance $D$ between the centers of these two signals. For this reason, it is possible to measure the diameter of a fine wire with an error of less than 0.5 micron for a diameter of 100 microns. Moreover, the accuracy of the measurement is not affected by the variation in the output of the laser light.

As above described the invention provides a novel apparatus for measuring the diameter of a fine wire at a high accuracy without the necessity of making mechanical contact to the wire. For this reason, the apparatus is suitable to continuously measure the diameter of such fine wires as memory wires for use in electronic computers, enameled wires, polyurethane wires while they are being produced in production lines. Moreover, the accuracy of measurement is not affected by the variation in the output of the laser beam.

What is claimed is:

1. Apparatus for measuring the diameter of a fine wire, comprising means for irradiating the fine wire with parallel laser beams in the diametric direction thereof thereby forming a Fraunhofer diffraction image, an optical filter for making the level of the signal at the optical center of said Fraunhofer diffraction image to be equal to the level of the signal subjected to a predetermined number of diffractions, a photoelectric transducer responsive to said two signals, a shaping circuit connected to the output of said photoelectric transducer, a level slicing circuit connected to the output of said shaping circuit and a counter connected to the output of said level slicing circuit, said counter operating to count and display the distance between the centers of said center signal and of said signal subjected to a predetermined number of diffractions.

2. The apparatus according to claim 1 which further comprises means including a rotary disc mask having a slit and a stationary light intercepting mask having a slit for detecting the positions of the bright spots of said Fraunhofer diffraction image at said optical center and subjected to said predetermined number of diffractions.

3. The apparatus according to claim 1 wherein said counter comprises means for adding each one half of the width of said center signal and of the signal subjected to said predetermined number of diffractions to the spacing between these signals thereby determining said distance.

* * * * *